Dec. 25, 1934. E. T. GOODRICH Re. 19,405

AUTOMATIC WINDOW LOCK

Original Filed Feb. 11, 1933

INVENTOR.
EDMOND T. GOODRICH
BY
Barnes, Kisselle & Langhlin
ATTORNEYS.

Reissued Dec. 25, 1934

Re. 19,405

UNITED STATES PATENT OFFICE 19,405

AUTOMATIC WINDOW LOCK

Edmond T. Goodrich, Detroit, Mich.

Original No. 1,925,244, dated September 5, 1933, Serial No. 656,216, February 11, 1933. Application for reissue April 27, 1934, Serial No. 722,736

4 Claims. (Cl. 292—238)

This invention relates to an automatic window lock and has to do particularly with that type of lock for normally limiting the movement of a window sash.

Heretofore various types of locks have been used, which, when actuated or manually positioned, limit the movement of a window. In most of these prior art devices it is usually necessary to cut away or otherwise fabricate either a part of the window sash or a part of the frame.

It is the object of the present invention to provide an extremely simple and efficacious unit which may be readily attached to a part of the window frame, preferably the inside stop, and which will automatically, by its own inherent construction, move into locking position to permit only a predetermined movement of the window sash. More specifically, the present invention embodies a lock or stop unit adapted to be pivotally connected to the inside stop of the window frame and out of the vertical plane of movement of the window sash, but a portion of which because of certain counterweighting construction will be normally projected into the plane of the window sash.

Other features embody details of construction as will be more clearly set forth in the claims.

Figure 1:
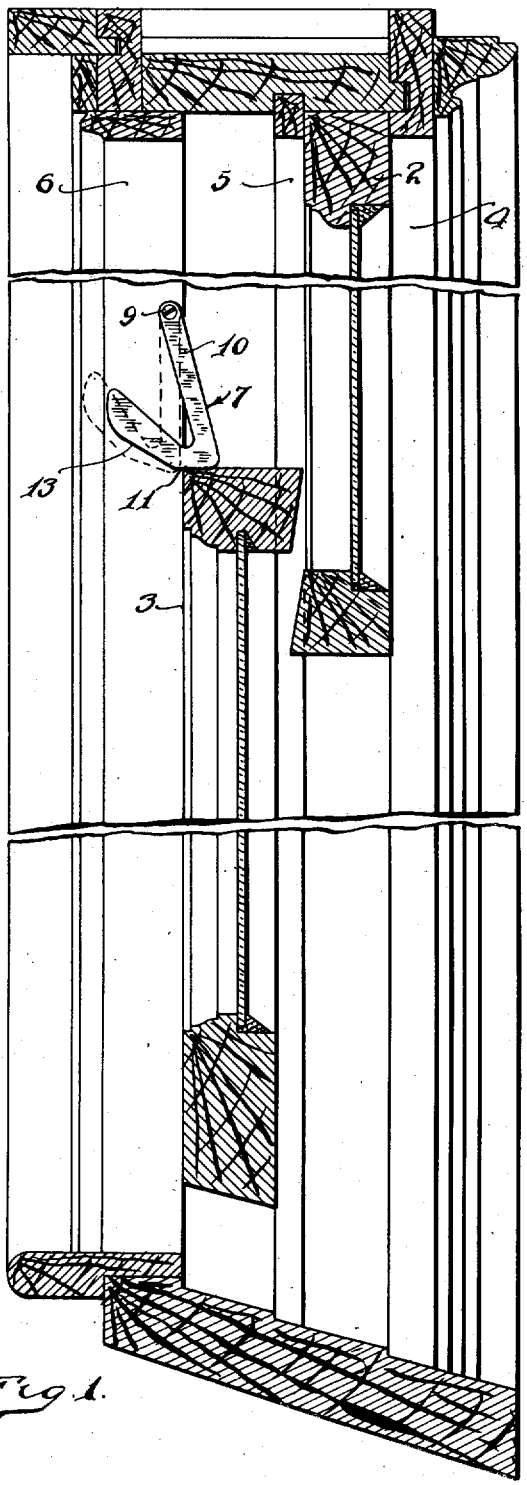
Fig. 1 is a vertical sectional view of a standard window frame and window sash unit and illustrating the preferred manner of positioning my novel stop or lock unit relative to the lower window sash.

In illustrating my invention I have shown same as being used in connection with a standard window frame of the double hung type, wherein the upper window sash 2 and the lower window sash 3 are guided in their upward and downward movement by three members, namely, a blind stop or reveal 4, a parting stop 5, and an inside stop or garnish molding 6.

Figure 2:
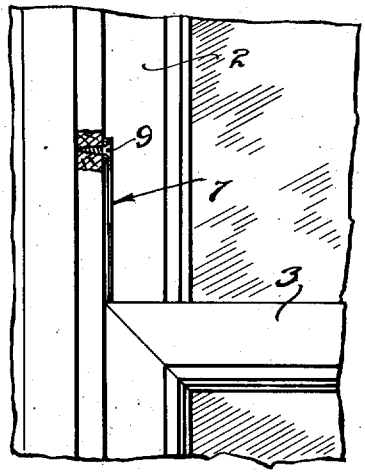
Fig. 2 is a fragmentary elevation showing the preferred manner of mounting the lock or stop to the inside stop of the frame.
Figure 3:
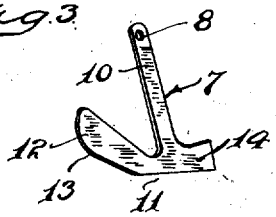
Fig. 3 is a perspective view of a slightly modified form of my novel lock unit, which may be used in connection with either window sash.

My window lock or stop unit is best illustrated in Fig. 3 and may be generally designated 7. This unit 7 is preferably provided with an aperture 8 through which the unit is pivotally mounted by means of a screw 9 to the inside stop, as best shown in Figs. 1 and 2. This lock member 7 preferably consists of an arm portion 10, a contacting or stop surface 11, and a counterweight 12 having a curved portion 13.

This lock member 7 may consist of a simple, relatively thin stamping, and because of the counterweighted portion 12 the arm 10 will normally be positioned at an angle when the arm is freely hung by the pivot 9, as shown in Fig. 1. The mass of the counterweight will obviously determine the normal angle with which the arm 10 hangs with respect to the vertical.

When the lower sash 3 is in its normal, closed and lowermost position, the lock member 7 will hang in the position shown in solid lines in Fig. 1. When the window sash 3 is raised, either from the inside or from the outside, the upper member of the sash 3 will contact with the flat surface 11 of the lock members, which contact will limit the upward movement of the window sash 3. With the window in the position shown in Fig. 1, the outwardly-inclined and curved surfaces 13 will effectively prevent movement of the stop 7 by the insertion of wire or any other means through the bottom of the window sash in an attempt to dislocate the lock member. In other words, the effect of contact of any implement with the surface 13 will tend to swing the stop 7 counterclockwise, as viewed in Fig. 1, instead of clockwise. To raise the window higher from the inside, it is only necessary to grasp the counterweighted portion 12 and swing the member 7 inwardly.

In its preferred use, the member 7 is adapted to be automatically positioned relative to the lower window sash 3 and to only normally limit the upward movement thereof. It will be obvious that my stop with the counterweighted principle can also be utilized to limit the lowering of the upper window sash. To accomplish this the member 7 will preferably have an extension 14 which may be normally positioned to contact with the lower surface of the upper member of the window sash 2.

Figure 4:
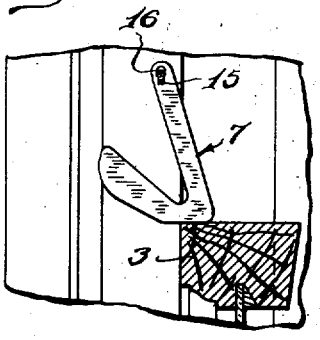
Fig. 4 is a fragmentary view illustrating a slightly modified form of the lock unit, where an additional means is provided for maintaining the lock unit in fixed position, and illustrating the preferred embodiment.

In the modification shown in Fig. 4, the aperture of the lock 7 is shown provided with a keyway 15 and the fastening means 16 is preferably provided with a small key projection, whereby when the lock member 7 is contacted from the bottom by the window sash 3, the key will fit within the keyway to prevent lateral or oscillating movement of the lock member.

What I claim is:

1. A one piece lock member for limiting the opening movement of a window sash, comprising an arm pivotally mounted to a stop guide for the window sash, said pivotal mounting being outside the normal plane of movement of the window sash, and a counterweight adjacent one end of said arm for normally projecting a portion of said arm within the plane of movement of said window sash, said portion of the arm being shaped and normally positioned to contact directly with said window sash to prevent any further opening of the window and to rigidly hold the lock in position if pressure is applied to force the window to a wider open position.

2. A lock member for limiting the movement of a window sash, comprising an arm pivotally mounted to a stop guide for the window sash, said pivotal mounting being outside the normal plane of movement of the window sash, and a counterweight adjacent one end of said arm for normally projecting a portion of said arm within the plane of movement of said window sash, said arm being normally positioned at an angle to the vertical by said counterweight, said portion of the arm projecting within the plane of movement of the sash having a substantially horizontal surface adapted to contact and limit the movement of the window sash, the combination of such substantially horizontal surface, angular arm, and pivotal mounting serving to more rigidly hold the lock in position if pressure is applied to force the window to a wider open position.

3. A lock member for limiting the movement of a window sash, comprising an arm pivotally mounted to a stop guide for the window sash, said pivotal mounting being outside the normal plane of movement of the window sash, and a counterweight adjacent one end of said arm for normally projecting a portion of said arm within the plane of movement of said window sash, said arm being normally positioned at an angle to the vertical by said counterweight, said portion of the arm projecting within the plane of movement of the sash having a substantially horizontal surface adapted to contact and limit the movement of the window sash, the combination of said substantially horizontal surface, angular arm and pivotal mounting serving to more rigidly hold the arm in position if pressure is applied to force the window to a wider open position, the greater portion of said counterweighted portion being to the rear of the window sash when in locking position and having a lower surface projecting inwardly and upwardly from the sash.

4. A one piece lock member for limiting the opening of a window sash, comprising an arm pivotally mounted to a stop guide for the window sash, said pivotal mounting being outside the normal plane of movement of the window sash, said arm including a substantially flat locking surface movable about said pivot, and a counterweight extending at an angle to said arm to normally position said substantially flat locking surface in a path to contact with the window, said locking surface being normally positioned to contact directly with said window sash to prevent any further opening of the window and serving to more rigidly hold the lock member in position if pressure is applied to force the window to a wider open position, said member being so pivotally mounted that it may be swung out of locking position by movement of said arm away from the path of movement of the window and beneath said pivot whereby said arm is moved to a position substantially parallel with the window sash to allow the window to be raised.

EDMOND T. GOODRICH.